US009399445B2

(12) United States Patent
Abou Mahmoud et al.

(10) Patent No.: US 9,399,445 B2
(45) Date of Patent: Jul. 26, 2016

(54) DELEGATING CONTROL OF A VEHICLE

(71) Applicant: International Business Machines Corporation, Armonk, NY (US)

(72) Inventors: Alaa Abou Mahmoud, Dracut, MA (US); Sangeeta Gautam, Lexington, MA (US); David W. Joutras, Hyde Park, MA (US); Vinod A. Valecha, Nashik (IN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 14/272,737

(22) Filed: May 8, 2014

(65) Prior Publication Data

US 2015/0321641 A1 Nov. 12, 2015

(51) Int. Cl.
| | |
|---|---|
| *G05D 1/00* | (2006.01) |
| *B60R 25/00* | (2013.01) |
| *B60R 25/20* | (2013.01) |
| *G06F 21/60* | (2013.01) |
| *B60R 25/102* | (2013.01) |
| *B60R 25/24* | (2013.01) |
| *G06F 21/31* | (2013.01) |

(52) U.S. Cl.
CPC ............... *B60R 25/00* (2013.01); *B60R 25/102* (2013.01); *B60R 25/2018* (2013.01); *B60R 25/241* (2013.01); *G05D 1/0055* (2013.01); *G06F 21/31* (2013.01); *G06F 21/60* (2013.01); *G06F 21/604* (2013.01)

(58) Field of Classification Search
None
See application file for complete search history.

(56) References Cited

U.S. PATENT DOCUMENTS

| | | | |
|---|---|---|---|
| 7,650,842 | B2 | 1/2010 | Reisch |
| 8,098,174 | B2 | 1/2012 | Moshchuk et al. |
| 8,352,111 | B2 | 1/2013 | Mudalige |
| 8,374,743 | B2 | 2/2013 | Salinger |
| 8,417,444 | B2 | 4/2013 | Smid et al. |
| 8,595,037 | B1 | 11/2013 | Hyde et al. |
| 2005/0285429 | A1 | 12/2005 | Valois |
| 2008/0262669 | A1 | 10/2008 | Smid et al. |
| 2011/0148663 | A1 | 6/2011 | Barth |
| 2012/0188100 | A1 | 7/2012 | Min et al. |
| 2012/0271500 | A1 | 10/2012 | Tsimhoni et al. |
| 2013/0086645 | A1 | 4/2013 | Srinivasan et al. |
| 2013/0226371 | A1* | 8/2013 | Rovik .................. H04L 63/102 701/2 |
| 2013/0226449 | A1* | 8/2013 | Rovik .................. G01C 21/362 701/424 |
| 2013/0231824 | A1 | 9/2013 | Wilson et al. |
| 2015/0210287 | A1* | 7/2015 | Penilla .................. B60W 40/08 701/49 |

OTHER PUBLICATIONS

Ferrara, Darla, "How to Put an Alarm on Valet Mode", eHow, © 1999-2014 Demand Media, Inc., <http://www.ehow.com/how_6633385_put-alarm-valet-mode.html>.

(Continued)

*Primary Examiner* — Adam Alharbi
(74) *Attorney, Agent, or Firm* — Alexander G. Jochym

(57) ABSTRACT

An identification of a vehicle is received. An identification of a first user to receive delegation of control of the vehicle is received. Authentication information for the first user for the vehicle is determined. A request to authenticate the first user for delegation of control of the vehicle to the first user is received. The request to authenticate includes at least the authentication information for the first user is determined. Responsive to the determination, control of the vehicle is delegated to the first user.

14 Claims, 5 Drawing Sheets

(56) References Cited

OTHER PUBLICATIONS

Guizzo, Erico, "How Google's Self-Driving Car Works", IEEE Spectrum, Posted Oct. 18, 2011, <http://spectrum.ieee.org/automaton/robotics/artificial-intelligence/how-google-self-driving-car-works>.

IBM, "Method and System for Facilitating Autopilot Features in a Vehicle", IP.com Prior Art Database Technical Disclosure, IPCOM000192629D, Jan. 26, 2010, pp. 1-4.

Kircher et al, "Tactical Driving Behavior With Different Levels of Automation", IEEE Transactions on Intelligent Transportation Systems, vol. 15, No. 1, Feb. 2014, © 2013 IEEE, pp. 158-167.

Timpner et al, "Secure Smartphone-based Registration and Key Deployment for Vehicle-to-Cloud Communications", CyCAR'13, Nov. 4, 2013, Berlin, Germany, Copyright 2013 ACM, pp. 31-36.

"Autonomous driving Renault NEXT TWO, for an affordable, hyperconnected mobile lifestyle", Renault, Press Kit, Feb. 6, 2014, pp. 1-17.

"Self Vehicle Communication System (SVCS)", IP.com Prior Art Database Technical Disclosure, Authors et al. Disclosed Anonymously, IPCOM000215279D, Feb. 23, 2012, pp. 1-4.

\* cited by examiner

DELEGATING CONTROL OF A VEHICLE

BACKGROUND

The present invention relates generally to autonomous vehicles and more particularly to delegation of control of an autonomous vehicle.

An increasing trend towards developing automated or semi-automated equipment is present in today's world. Specifically, autonomous, driverless vehicles are a rapidly changing and growing area of technology. Autonomous vehicles are configured to operate in an autonomous mode in which the vehicle navigates through an environment with little or no input from a driver. Some autonomous vehicles may require only an initial input, while some require continuous input from an operator, such as a pilot, driver, or passenger. An autonomous vehicle typically includes one or more sensors that are configured to sense information about the environment. For example, autonomous vehicles may include lasers, sonar, radar, cameras, and other devices that scan and record data, including static and dynamic objects, within the vehicle's surroundings. These devices, in combination (and in some cases alone), may be used to build three-dimensional models of a vehicle's precise location and the objects detected in the vehicle's surroundings. The vehicle may use the three-dimensional information to navigate through the environment. For example, if the sensors detect that the vehicle is approaching an obstacle, the vehicle can navigate around the obstacle, independent of human control.

SUMMARY

Embodiments of the present invention include a method, computer program product, and system for delegating control of a vehicle. In one embodiment, an identification of a vehicle is received. An identification of a first user to receive delegation of control of the vehicle is received. Authentication information for the first user for the vehicle is determined. A request to authenticate the first user for delegation of control of the vehicle to the first user is received. The request to authenticate includes at least the authentication information for the first user is determined. Responsive to the determination, control of the vehicle is delegated to the first user.

DETAILED DESCRIPTION

Embodiments of the present invention recognize there is an increasing trend towards the use of automated or semi-automated equipment in today's world. Some of the autonomous vehicles require an initial input, while some require continuous input from an owner or operator. However, as these autonomous vehicles become closer and closer to being integral parts of our daily lives, embodiments of the present invention recognize that there is currently no way to allow an owner or operator of a vehicle to delegate his or her vehicle to another party and still maintain control over some aspects of that vehicle. The most current technology is capable of tracking and locating where a vehicle is at a given time.

Embodiments of the present invention recognize that by utilizing a delegation process the owner of the vehicle may delegate his or her vehicle to a specific user, and then utilizing an access process the owner may monitor the user's use of the vehicle. First, this insures that the person receiving the delegation for the use of the vehicle is actually the intended person. Second, this insures that the vehicle is used in a way the operator determines and defines in an access type. An access type is a type of access granted to a user for a vehicle.

Figure 1:
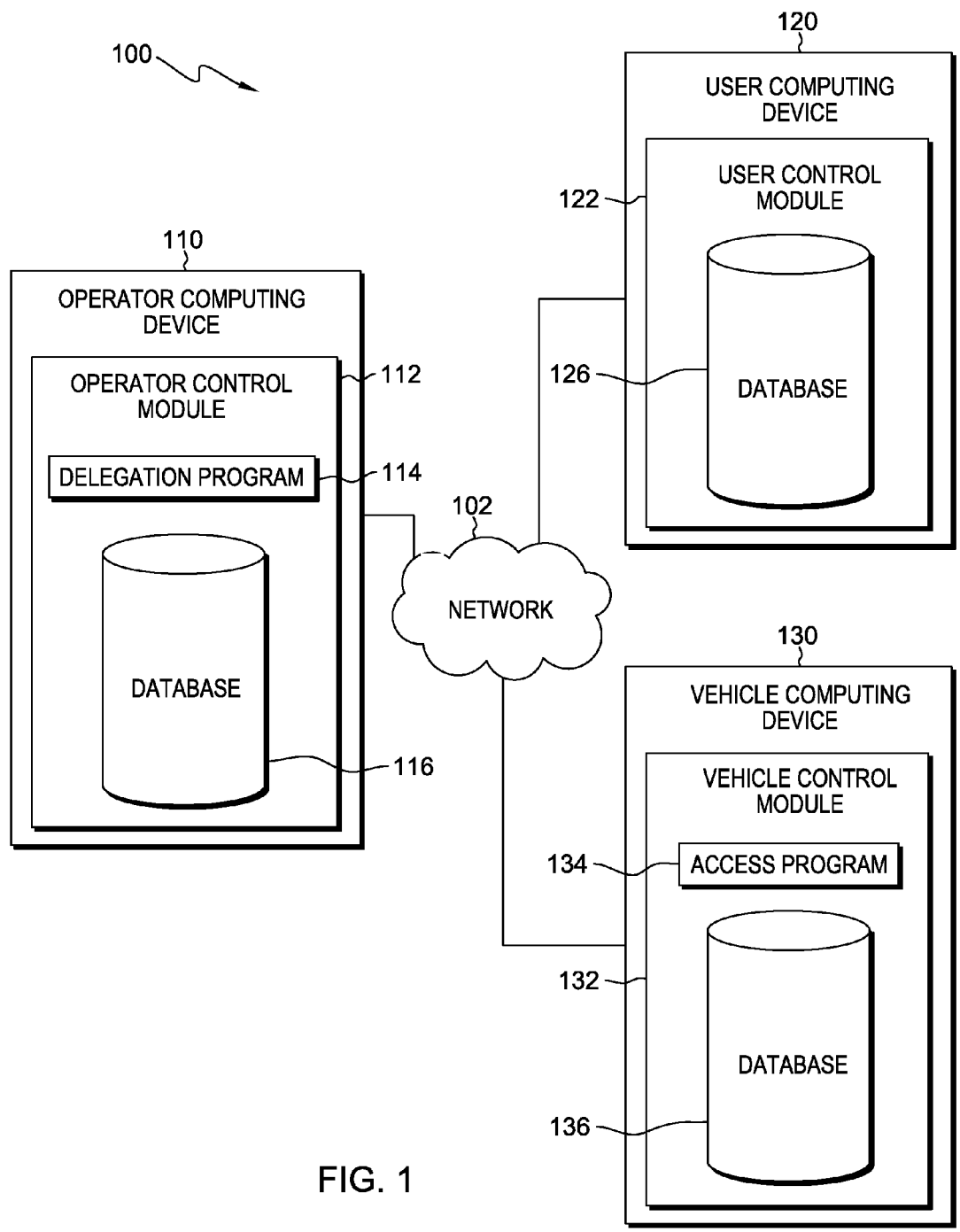
FIG. 1 is a functional block diagram of a computer system in which embodiments of the present invention may operate.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In a first embodiment, distributed data processing environment 100 includes operator computing device 110, user computing device 120, and vehicle computing device 130, interconnected over network 102. Network 102 can be, for example, a local area network (LAN), a wide area network (WAN) such as the Internet, or a combination of the two, and can include wired, wireless, fiber optic, or any other connection known in the art. In general, network 102 can be any combination of connections and protocols that will support communications via various channels between operator computing device 110, user computing device 120, and vehicle computing device 130, in accordance with embodiments of the present invention.

In various embodiments, operator computing device 110, user computing device 120, and vehicle computing device 130 can each include a laptop, tablet, or netbook personal computer (PC), a desktop computer, a personal digital assistant (PDA), a smart phone, or any programmable electronic device capable of communicating with each computing device within distributed data processing environment 100. In other embodiments, operator computing device 110, user computing device 120, and vehicle computing device 130 may each represent a server computing system utilizing multiple computers as a server system, such as in a cloud computing environment. In an embodiment, vehicle computing device 130 can be a computing device internal to the vehicle that runs other aspects of the vehicle as well. For example, vehicle computing device 130 can also run the cruise control, audio system, navigation system, etc., found within the vehicle. Alternatively, computing devices 110, 120, 130 can be any devices suitable for the foregoing intended use as known in the art.

In an embodiment, operator computing device 110 includes operator control module 112. Operator control module 112 includes delegation program 114 and database 116. Operator control module 112 is a program, application, or subprogram of a larger program that controls, maintains, and operates delegation program 114 and database 116. In an embodiment, operator control module 112 includes a security feature that verifies the identity of the operator, and that the operator has the permission or control to delegate the vehicle containing vehicle computing device 130. For example, operator control module 112 can be an application in a smart phone and when an operator opens operator control module 112 the operator can be required to sign in using a login identification and password that is specific to that operator. Alternatively, the security feature may be found in delegation program 114, which will be discussed later in detail with reference to database 116 and FIG. 3. In an alternative embodiment, delegation program 114 and database 116 can function on operator computing device 110 directly and without the inclusion of operator control module 112. In this embodiment, operator computing device 110 or delegation program 114 can perform any, some, or all of the actions of operator control module 112 discussed herein.

Delegation program 114 is a program, application, or subprogram of a larger program that allows an operator to grant control of a vehicle to a user. The operator can be, for example, a person who owns a vehicle exclusively, a person who owns a vehicle jointly with another party yet retains control of the user of the vehicle, a person who does not own but has control of the use of the vehicle, or a person that has a right to grant access to the vehicle. The operator is the vehicle delegator. Alternatively, the operator can be another program or device, for example, a computer for a car rental company. The type of control that can be granted can be of a temporary duration, renewable (e.g., with a license) by an operator, user, or both, or any other duration of time suitable for the foregoing intended use. The user can be, for example, a person who is receiving control of a vehicle, a person that is temporarily receiving control of a vehicle to delegate control to a third user, or another program or device, such as a computer that controls automated parking in a parking structure.

Database 116 resides on operator computing device 110. In another embodiment, database 116 may reside on user computing device 120, vehicle computing device 130, or on another device or component within distributed data processing environment 100, accessible via network 102. A database is an organized collection of data. Data found in a database is typically organized to model relevant aspects of reality in a way that supports processes requiring the information found in the database. Database 116 can be implemented with any type of storage device capable of storing data that may be accessed and utilized by operator computing device 110, such as a database server, a hard disk drive, or a flash memory. In other embodiments, database 116 can represent multiple storage devices within operator computing device 110. Database 116 may include data relating to an operator, such as data for the security feature, discussed previously, that is used to authenticate an operator. For example, database 116 may include an operator's login identification and a password associated with each of the operator's login. Login information can be created during setup of delegation program 114 and then stored in database 116.

Alternatively, databases 116, 126, and 136 can be any computer readable storage medium as found in the art. For example, the computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Database 116 may also include data corresponding to at least one vehicle. For example, database 116 may include vehicle information such as make, model, year, and style of car, and information on at least one operator for each vehicle. Additionally, each operator is associated with at least one vehicle. For example, vehicle A may be linked to operator A. Vehicle B may be linked to operator A and operator B. Vehicle C may be linked to operator B and operator C. Multiple operators for a vehicle may occur in instances such as a family vehicle that is linked to both of the parents. Alternatively, multiple vehicles for an operator may occur in instances such as a company's fleet of vehicles that are linked to a single operator for delegation to employees of the company.

Database 116 may include data relating to a user and authenticating that user. The user is the person or computing device that is receiving delegation of the vehicle and will have control of the vehicle for a designated time period. The data can be a password, for example, a custom pin number, a randomly generated pin number, a onetime password using a password generator, a Quick Response (QR) code, an encrypted communication, a hyperlink, biometric data, or any other type of password data suitable for the foregoing intended use as known in the art. For example, the operator can create a custom pin number that the operator must notify the user of and the operator also updates database 116 via operator computing device 110. In an alternative embodiment, delegation program 114, or any other program, can create a random pin number, a custom pin code, a one time password using a password generator, a QR code, an encrypted communication, or a hyperlink that the operator can send to the user to use to authenticate access.

In another embodiment, database 116 can store password data that requires information about the user before delegation program 114 is executed. Here, database 116 may include biometric data specific to the user. For example, a user initially provides operator control module 112 with a scan of the user's fingerprint(s) that is saved in database 116. Alternatively, biometric data may be an iris scan, a facial scan, a full body scan, or any other type of biometric data suitable for the foregoing intended use as known in the art.

In another embodiment, database 116 may not be required. Authentication may occur with the use of a software token. A software token is a type of two-factor authentication security device that may be used to authorize the use of computing services. Software tokens can be stored on a general-purpose electronic device such as a desktop computer, laptop, PDA, or mobile phone, and can be duplicated. The token may be received by the user in the form of an encrypted communication, hyperlink, or any other method suitable for the foregoing intended use as known in the art. The software token is activated by the user, and vehicle and user information found in the software token, including a type of access, notifies vehicle control module 132 of the proper authentication.

User computing device 120 includes user control module 122. User control module 122 includes database 126. User control module 122 is a program, application, or subprogram of a larger program that controls and interacts with aspects of delegation program 114, from the user's perspective, as user control module 122 operates on user computing device 120.

User control module 122 can display information regarding database 126 to the user, can display access information to the user from an access program, such as access program 134 on vehicle computing device 130, or can display prompts to the user so that a user can make a decision. For example, delegation program 114 can send information regarding multiple pickup locations to user control module 122, and user control module 122 can allow the user to choose which location for pickup is most suitable for him or her. In another example, user control module 122 can display a key code, sent from operator control module 112, to a user that must be entered into vehicle control module 132 in the vehicle to complete the authentication of the delegation process. Additionally, user control module 122 includes a security feature that verifies the identity of the user, similar to the security feature in operator control module 112. For example, user control module 122 can be an application on a smart phone and when the user opens user control module 122 the user can be required to sign in using a login identification and password that is specific to that user. Database 126 may be structured similar to database 116 and can store information similar to that stored in database 116.

Vehicle computing device 130 includes vehicle control module 132. Vehicle control module 132 includes access program 134 and database 136. Vehicle control module 132 is a program, application, or subprogram of a larger program that controls and maintains aspects of delegation program 114 from the vehicle's perspective, as vehicle control module 132 operates on vehicle computing device 130. Vehicle control module 132 can display database 136 information corresponding to delegation program 114 to the user, can display database 136 information corresponding to access program 134 to the user, or monitor information about the vehicle for reporting to the operator computing device 110 or any other device. For example, vehicle control module 132 can display on a user interface (not shown) a request to enter a key code (external to the vehicle) to a user to complete the delegation process. In another example, vehicle control module 132 can record speed and location data and this data can be used by access program 134, as discussed in the following paragraph. Database 136 may be structured similar to database 116 and can store information similar to that stored in database 116.

In any embodiment, operator control module 114, user control module 122, and vehicle control module 132 may include a user interface (not shown). A user interface is a program that provides an interface between a user of any of the modules and the programs found within the modules. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces, which require commands to be typed on the keyboard. The actions in GUIs are often performed through direct manipulation of the graphics elements.

Access program 134 is a program, application, or subprogram of a larger program that maintains information regarding access to the vehicle, including notifying a user of the type of access granted to them from the operator, monitoring the vehicle in reference to the type of access granted to the operator, and notifying an operator of a request for updates or changes to the type of access granted to the user. Access program 134 may not run until operator computing device 110, via delegation program 114, has granted access for a user operating user computing device 120 to a vehicle hosting vehicle computing device 130. Access program 134 is in communication with delegation program 114 via network 102. In an alternative embodiment, access program 134 can be located on operator computing device 110, or user computing device 120, and receive information from vehicle control module via network 102.

Figure 2:
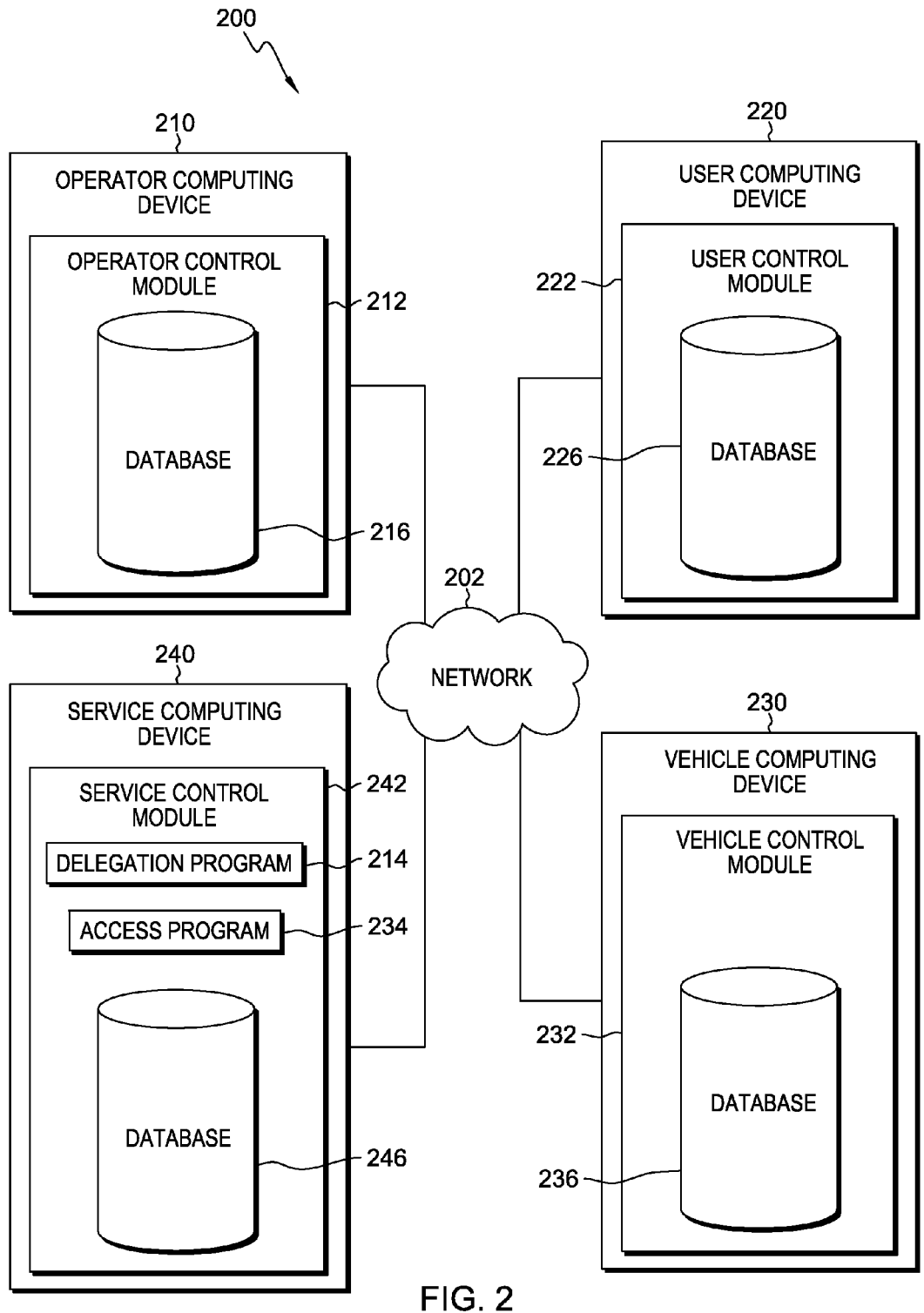
FIG. 2 is a functional block diagram of a computer system in which alternative embodiments of the present invention may operate.

In an alternative embodiment of a computer system in accordance with the present invention, as shown in FIG. 2, distributed data processing environment 200 includes operator computing device 210, user computing device 220, vehicle computing device 230, and service computing device 240. Operator computing device 210 includes operator control module 212, which includes database 216. User computing device 220 includes user control module 222, which includes database 226. Vehicle computing device 230 includes vehicle control module 232, which includes database 236. Service computing device 240 includes service control module 242, which includes delegation program 214, access program 234, and database 246. Operator computing device 210, user computing device 220, and vehicle computing device 230 are similar, respectively, to operator computing device 110, user computing device 120, and vehicle computing device 130, as discussed previously. Database 216, 226, 236, and 246 may store, respectively, similar data in a similar manner as is stored in database 116, 126, and 136, as discussed previously with reference to FIG. 1.

In various embodiments, service computing device 240 can include a laptop, tablet, or netbook personal computer (PC), a desktop computer, a personal digital assistant (PDA), a smart phone, a mainframe computer, or a networked server computer. Further, service computing device 240 can be a computer system utilizing clustered computers and components to act as a single pool of seamless resources when accessed through the network or can represent one or more cloud computing devices.

In the alternative embodiment, service computing device 240 controls the delegation and access responsibilities as discussed above with reference to FIG. 1. Here, service computing device 240 can be owned or controlled by a company providing either delegation service, access service, or both. For example, this service could be commercially available supplemental to current subscription-based communication services that provide in-vehicle security, hands free calling, turn-by-turn navigation, or remote diagnostics systems for vehicles. Alternatively, a company can implement the service to control a fleet of vehicles it owns or of which it maintains responsibility for operation. Service computing device 240 hosts service control module 242.

Service control module 242 is a program, application or subprogram of a larger program that controls and maintains aspects of the delegation program 214 and access program 234 from the service provider's perspective. Service control module 242 includes delegation program 214, access program 234, and database 246. Database 246 may contain similar data as stored in database 116, 126, and 136 discussed previously. In an alternative embodiment, delegation program 214, access program 234, and database 246 can be located on any of operator computing device 210, user computing device 220, or vehicle computing device 230, and receive information via network 202. Operator control module 214, user control module 222, vehicle control module 232, and service control module 242 may include, respectively, a user interface, with capabilities similar to the UI discussed with operator control module 114, user control module 122, and vehicle control module 232, as discussed previously with reference to FIG. 1.

In the alternative embodiment, operator control module 212 interacts with delegation program 214 when delegation program 214 is activated by an operator. Operator control module 212 can perform the security function, described previously, to verify and authenticate the identity of the operator. Once the operator has been authenticated, the operator uses delegation program 214 to delegate control of the vehicle to the user of user computing device 220, as discussed previously. Here, operator control module 212 notifies delegation program 214 that the operator is delegating a vehicle to a user. Delegation program 214 then controls the delegation process. Delegation program 214 also updates database 246 based on user inputs in the operator control module 212, as discussed previously. Additionally, delegation program 214 updates database 246 with information on the access type associated with the user receiving delegation.

Delegation program 214 also notifies user control module 222 that the vehicle is being delegated to the user and provides the user, via database 226, with information associated with the delegation. The notification can take place simultaneously with the operator initiating delegation with delegation program 214, or the notification may take place after a period of time. For example, as discussed previously with reference to FIG. 1, the user control module, here user control module 222, can display information stored in database 226 to the user, can display access information to the user from access program 234, or can display prompts to the user so that a user can make a decision corresponding to the received delegation. For example, delegation program 214 can send information regarding multiple pickup locations or times for display by user control module 222 on a user interface (not shown), and user control module 222 can allow the user to choose which location or time for pickup is most suitable for him or her. In another example, user control module 222 can display on a user interface (not shown) a key code to a user that must be entered into vehicle control module 232 in the vehicle to continue the delegation process. When the user wants to gain access to the vehicle, the user enters information from database 226, provided to the user via user control module 222, into the vehicle control module 232. Vehicle control module 232 communicates this data with service control module 242, and more specifically delegation program 214, for authentication.

Service control module 242 determines if delegation program 214 can process the authentication. If delegation program 214 is busy handling other delegation requests, then service control module 242 places the delegation request in a delegation queue stored in database 246. The delegation queue is a list of delegation requests for processing by delegation program 214 in the order in which they were received. Alternatively, this order could be determined by a priority level of a user, a vehicle, or operator. The priority level can be determined by an operator in real-time, determined by the operator during the initial setup of delegation program 214, or can be determined by the time of day, type of use, etc. If the delegation program 214 can process the delegation immediately then the delegation queue is empty and can be bypassed. In another embodiment, the delegation queue may include authentication data stored for multiple delegation requests, which can be distributed to users corresponding to the delegation request at a pre-determined time.

Delegation program 214 receives data from vehicle computing device 230 that a user attempted an access into vehicle control module 232, and compares that data with data from database 246 stored on service computing device 240. If the data received is the same as the data found in database 246 then authentication is confirmed and delegation is granted. For example, a user receives a pin code and, upon arriving at the vehicle, enters the pin code into vehicle control module 232. Vehicle control module 232 sends the pin code to service control module 242. If the authentication can be handled immediately, delegation program 214 takes the pin code and compares it to the pin code in database 246 for the associated user control module 222, and vehicle control module 232 that made the authentication request. If the pin codes match up, then delegation program 214 communicates to vehicle control module 232 to allow the user access to the vehicle. Alternatively, a software token can be used, as discussed previously, and the information required for authentication regarding the vehicle and the user can be contained in the token, including information about the access type. Here, the required information is found in the software token.

If access to the vehicle is granted to the user, then delegation program 214 notifies access program 234 of the type of access granted to the user for the vehicle. Access program 234 sends the access information to user control module 222, and user control module 222 updates database 226 with the access type so that the user is aware of the type of access. Additionally, access program 234 sends the access information to vehicle control module 232 and vehicle control module 232 updates database 236 with the access type. Then, access program 234 monitors the use of the vehicle by receiving information about the vehicle from vehicle control module 232. If there is a violation of the access type then access program 234 can notify one or each of delegation program 214, operator control module 212, user control module 222 or vehicle control module 232.

Figure 3:
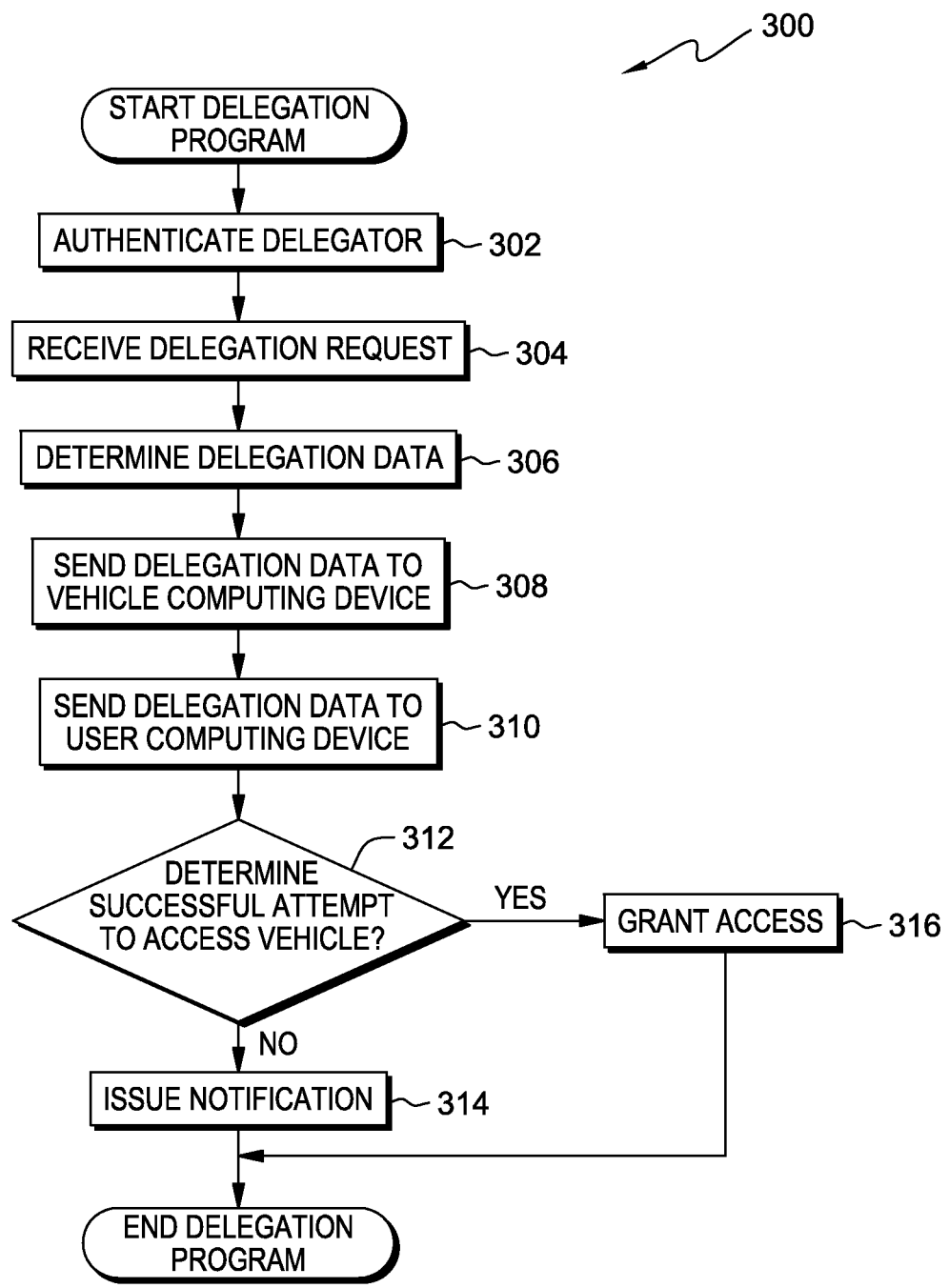
FIG. 3 is a flowchart of the steps of a delegation program or function in the computer system of FIG. 1, in accordance with an embodiment of the present invention.

FIG. 3 shows a flowchart of workflow 300, in accordance with an embodiment of the present invention. In one embodiment, the steps of the workflow are performed by delegation program 114. Alternatively, the steps of the workflow can be performed by access program 134, by both programs, or by any of the control modules shown. A user can invoke workflow 300 upon determining a user to whom to delegate a vehicle, or upon determining a vehicle to which to delegate to a user. In another embodiment, workflow 300 can be invoked automatically under the control of another program, for example, in a company setting where one user can delegate a fleet of vehicles to a group of users at the same time.

Turning now to FIG. 3, workflow 300 depicts a function of delegation program 114 for providing delegation of a vehicle from an operator to a user. Workflow 300 is depicted in the form of the first embodiment, and alterations of this workflow can be used to depict the same actions of the workflow in relation to the alternative embodiments. For example, in an alternative embodiment wherein delegation program 214 and access program 234 are found on service computing device 240, some of the actions of delegation program 114 and access program 134 of an embodiment can be performed by operator control module 112, or vehicle control module 132 in the alternative embodiment.

Delegation program 114 authenticates the delegator (step 302). Here, an operator opens delegation program 114 on operator computing device 110, and the operator enters his or her credentials so that delegation program 114 can identify the operator, and determine if the operator has authorization powers on any vehicle(s), and the vehicle(s) of which the operator has control. As discussed previously, the authentication step can be performed by operator control module 112. For example, a father (the operator in this example) opens an application (the delegation program) on his phone. The father enters his login identification and associated password and the application verifies the correct login identification and password combination and then logs into the application. The credentials are compared to the credentials known in database 116 for that operator for authentication purposes. This is similar to the security feature found in operator control module 112, discussed previously. If authenticated, the father can then be shown a vehicle(s) that he has control of, such as the family sedan.

Delegation program 114 then receives a request to delegate (step 304). Here, an operator, who has been authenticated (step 302), tells delegation program 114 which vehicle he or she will be delegating, to what user to whom the vehicle will be delegated, and what type of access the user will have in regards to the vehicle. For example, the father can decide that he wants to delegate the family sedan and communicates to delegation program 114 that he wants to delegate the family sedan to his daughter (the user in this example). Alternatively, the operator can delegate the vehicle to multiple users. For example, the father can delegate the family sedan to both his daughter and his son. This is useful in cases where both users will be in the vehicle and both users can control the vehicle, but the operator is unsure as to which one will control the vehicle at any given time. In an embodiment, both users have the same login identification and password. In an alternative embodiment, each user has a separate and distinct login identification and password, and therefore the vehicle knows which user is operating the vehicle at any specific time. The father communicates to delegation program 114 that the family sedan may be used for the next 4 hours with no geographical limitations on the use. Alternatively, the father could restrict access to a specified geographical area. For example, the father could limit the vehicles use to 25 miles from his home, or to the city limits of the city in which the family lives.

Delegation program 114 determines the delegation data to use to authenticate the user (step 306). Here, the operator tells the delegation program what type of authentication the operator would like to use. For example, the father can create a custom pin code. The delegation data would be stored in database 116. The father then may notify his daughter of the pin code independent of actions in workflow 300. Alternatively, delegation program 114 can notify the daughter directly, for example, via an email or text message. In another embodiment, the user could use biometrics already stored in database 116. For example, the father could tell delegation program 114 to use a fingerprint for delegation data, and database 116 would already have a copy of his daughters fingerprint to use for delegation. In even another embodiment, the user could use a physical device received from the delegating party. For example, the father could give a credit card sized card, similar to an ID badge known in the art, to his daughter that could be read by a scanning system found in vehicle computing device 130, or located on the vehicle capable of communicating with vehicle computing device 130, for authentication.

Delegation program 114 sends delegation data to vehicle computing device 130 (step 308). The delegation data can be stored in database 136. Alternatively, delegation data can be communicated directly to vehicle control module 132 and stored in database 136. Here, delegation program 114 notifies vehicle computing device 130 of the type of authentication that will occur, for example, a random pin code, biometrics, etc., and also the specific delegation data that must be entered to authorize use of the vehicle to a specific user(s).

Delegation program 114 communicates delegation data to user computing device 120 (step 310). User computing device 120 then stores delegation data in database 126 for access by user control module 122. Here, delegation program 114 notifies user computing device 120 of the type of authentication that will occur, for example, a random pin code, biometrics, etc., and also the specific delegation data that must be entered to authorize use of the vehicle to a specific user(s), if applicable.

Delegation program 114 determines if the user made a successful attempt to access the vehicle (decision block 312). In other words, when the user attempts to gain access to the vehicle, delegation program 114 determines whether the user provided the proper delegation data that corresponds to delegation data stored in database 136. For example, whether the pin code the daughter entered matches the pin code that was stored in database 136 on vehicle computing device 130.

If there was a successful attempt (decision block 312, yes branch), then delegation program 114 grants access to the vehicle for the user attempting access. This ends the delegation program and begins access program 134, discussed in reference to FIG. 4 and workflow 400. For example, if the daughter entered the proper pin code that matched the pin code associated with her and the vehicle she was trying to access at a specific date and time, as stored in database 136, she will be granted access to the vehicle.

If it is determined that there was not a successful attempt to access the vehicle (decision block 312, no branch), then delegation program 114 issues a notification (step 314). The issue notification may be provided in the form of an alert, displayed on vehicle control module 132 so the user can read it, notifying the user that the access attempt was unsuccessful. Additionally, the issue notification can give the user options, such as, notifying the operator that the password didn't work and contacting the operator directly. Alternatively, the issue notification can be the vehicle hosting vehicle computing device 130 locking itself and driving back to the operator, or to a location where the operator stores the vehicle. In another embodiment, the issue notification may notify the operator directly, giving the operator the option to communicate directly with the user via vehicle computing device 130, to contact the user on user computing device 120, or to notify the proper authorities (police) of a possible attempt to steal or harm the vehicle.

Figure 4:
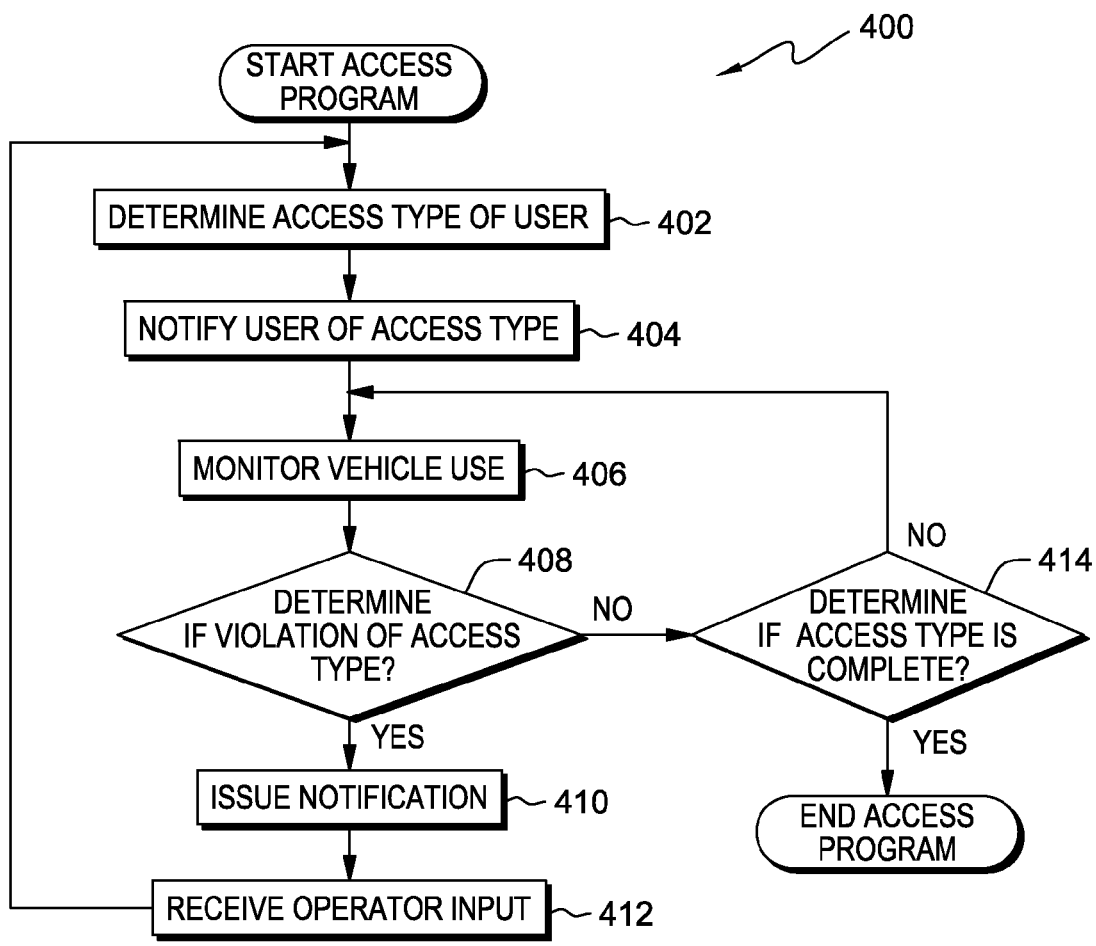
FIG. 4 is a flowchart of the steps of an access program or function in the computer system of FIG. 1, in accordance with an embodiment of the present invention.

Turning now to FIG. 4, workflow 400 depicts a function of access program 134 for monitoring use of a vehicle that has been delegated to a user. Workflow 400 is depicted in the form of a first embodiment and alterations of this workflow can be used to depict the same actions of the workflow in relation to the alternative embodiments. For example, in an alternative embodiment wherein delegation program 214 and access program 234 are found on service computing device 240, some of the actions of delegation program 114 and access program 134 can be performed by operator control module 212, or vehicle control module 232 in the alternative embodiment. In an embodiment, workflow 400 begins after the completion of workflow 300. Alternatively, workflow 400 may function independently of workflow 300.

Access program 134 determines an access type for the user (step 402). For example, an operator, in step 304 of workflow 300, may notify delegation program 114 of the access type for the user and the vehicle when the delegation attempt is successful. Upon a granting of access to the vehicle in step 316 of workflow 300, delegation program 114 may notify access program 134 of the access type for storage in database 136. In yet another embodiment, access program 134, upon a successful access attempt, may request the access type from delegation program 114, or from an operator. In another embodiment, access program 134 may retrieve the access type from a database, for example, database 136, containing access type information associated with user identification. In even another embodiment, upon a successful access attempt, the operator may notify access program 134 of the access type for storage in database 136. In an alternative embodiment, where there are multiple users of a vehicle, there can also be multiple access types. For example, if the father delegates the vehicle to both the son and the daughter, and the daughter is below a certain age and has a restricted license that does not allow her to drive the vehicle within a certain time period, the access delegated to the older son may have fewer limitations with respect to the time of day that the son can drive.

The access type may be a time period in which the user can maintain control of the vehicle, an area within which the user may operate the vehicle, determined by methods such as geo-fencing, rules over the type of access that a user may grant to a third party for the vehicle, a maximum speed at which the user may operate the vehicle, rules limiting access to devices within the vehicle, or any other type of access control suitable for the foregoing intended use. For example, the father may limit his daughter's access type to twenty-five miles from their home. In another example, the father may limit the daughter's access type to four hours from when access is granted. In yet another example, the father may restrict the daughter's ability to grant access to friends so that the father knows that only the daughter will be utilizing the vehicle. In yet another example, the father may limit the daughter's ability to drive after a certain time, in a fashion similar to "Cinderella" licenses or driver's permits that do not allow young adults to drive between the hours of midnight and six in the morning. In yet another example, the father may limit the daughter's ability to drive the vehicle at excessive speeds. In yet another example, the father may limit use and adjustments to user options including the sound system, such as the radio, while the vehicle is in use, or limit hands-free cell phone usage while driving.

Access program 134 notifies the user of the access type (step 404). Here, access program 134 may notify the user by sending the access type to user control module 122. User control module 122 can store the access type in database 126, and user control module 122 may notify the user of the access type. For example, the application on a user's phone may display the access type. Alternatively, the application can have the phone notify the user using audio. In another embodiment, access program 134 can use vehicle computing device 130 to notify the user of the access type. For example, an application in the vehicle can use a heads-up or visual display in the vehicle to visually notify the user of the access type. Alternatively, an application in the vehicle can use the speakers and audio system to audibly notify the user of the access type.

Access program 134 monitors vehicle use (step 406). Here, access program 134 utilizes software and hardware existing in the vehicle. The software and hardware can work together and send information to access program 134. For example, the vehicle may contain a separate device integrated with a global positioning system (GPS), and the separate device sends information such as location, speed, etc., to access program 134. Alternatively, aspects of the separate device can be integrated directly into vehicle computing device 130. In another embodiment, access program 134 can monitor subsequent user delegations of the vehicle, for example, if the daughter delegates access to a friend. In yet another embodiment, access program 134 can monitor an internal clock to determine the time that the user has been utilizing the vehicle. In even another embodiment, access program 134 can send information about the vehicle use to the operator computing device 110, to a website (not shown), or to any other location that may be accessible by the operator so that the operator can review, in real-time or after the event has occurred, actions and operations the user has taken and performed with the vehicle. For example, a father may view a website that shows where the daughter has driven the vehicle. Alternatively, this information may be displayed on the father's cell phone.

Access program 134 determines if there is a violation of access type (decision block 408). Here, access program 134 compares the information received while monitoring the vehicle use (step 406) to the access type that has been determined (step 402). For example, access program 134 compares the location of the current vehicle, using the device integrated with a GPS, to the area that the vehicle is delegated to be, determined from the access type. In another example, access program 134 can determine the amount of time the user has been using the vehicle and compare it to the amount of time that the user is granted to use the vehicle.

If access program 134 determines there was a violation of the access type (decision block 408, yes branch), access program issues a notification (step 410). The issue notification may be in the form of an alert, displayed on vehicle control module 132 so the user can read it, notifying the user that they have violated the access type. Additionally, the issue notification can give the user options, such as, notifying the operator as to the reason why the access type has been violated. Additionally, the issue notification may include the vehicle hosting vehicle computing device 130, utilizing the autonomous vehicle controls (not shown) to determine a safe location to pullover and wait for an operator input, as discussed in reference to step 412. In another embodiment, the issue notification may notify the operator directly, giving the operator the option to communicate directly with the user via vehicle control module 132, to call the user on user computing device 120, or to allow the operator to change the access type. Alternatively, the issue notification (step 410), may not require an operator input and the workflow will proceed to monitor vehicle use (step 406).

Access program 134 receives input from the operator (step 412). Here, the operator decides what do about the user's violation of the access type and notifies access program 134. For example, if the daughter is delegated access to use the vehicle for four hours and needs an extra hour to complete her errands, the father may notify access program 134 that the daughter is granted an extra hour of access. In another example, if the daughter is delegated access to travel twenty five miles from home, and the daughter has crossed over that threshold and is now twenty six miles from home, the father may notify access program 134 that the daughter is no longer granted access and that the vehicle should use autonomous technology and return home. Upon completion of step 412, access program 134 returns to determine the access type for the user (step 402).

If access program 134 determines that there was no violation of the access type (decision block 408, no branch), then access program 134 determines if the access type is complete (decision block 414). For example, if the daughter was allowed to use the vehicle for four hours and the four hours have elapsed and she is no longer operating the vehicle, then her access type is complete. In another embodiment, if the daughter has returned the vehicle to her father then her access type is complete. If the access type is complete (decision block 414, yes branch) then the access program ends processing. If the access type is not complete (decision block 414, no branch) then the access program continues to monitor vehicle use (step 406), discussed previously.

In any of the above described embodiments, either workflow 300 or workflow 400 can have an emergency override step (not shown) that can occur anywhere in the workflows, and that can override any or all of the steps in either of the workflows. The emergency override may include a manually activated device internal to the vehicle that communicates with vehicle computing device 130, 230. Alternatively, a user may activate the emergency override via user computing device 120, 220. In another embodiment, the operator may activate the emergency override via operator computing device 110, 210. In yet another embodiment, a service provider may activate the emergency override via service computing device 240. The emergency override step allows a user or operator to override any aspects of delegation program 114 or access program 134.

For example, a user that is not delegated access to the vehicle using delegation program 114 may still drive the vehicle, for example, in an emergency situation. Here, the user might be taking someone to a hospital. In another example, a delegated user that is not allowed to travel outside of a certain area using access program 134 can perform an emergency override and drive the vehicle outside of that area. Here, the delegated user might be taking someone to a hospital and the hospital is outside of the area that the delegated user is allowed to take the vehicle. Here, when the emergency override step is activated by the user, at least one of the modules will notify the operator of the emergency override activation and allow the operator to monitor the reason for the emergency override and monitor the location of the vehicle. Alternatively, the emergency override step may give control of the vehicle to vehicle computing device 130 for autonomous control. Here, the user may suffer from a health emergency and be unable to drive the vehicle and the autonomous control can take over, determine the location of the nearest emergency service provider, notify the emergency service provider of the health issue, and then drive the vehicle to the provider.

In an embodiment, delegations can be generic, one-time or scheduled to happen periodically. For example, delegations can be done at the beginning of the work week, in a company setting, and employees can keep the vehicles for the week. Alternatively, a delegation could occur every Friday at 2:00 PM when a user is leaving an event that they have weekly, such as soccer practice.

Figure 5:
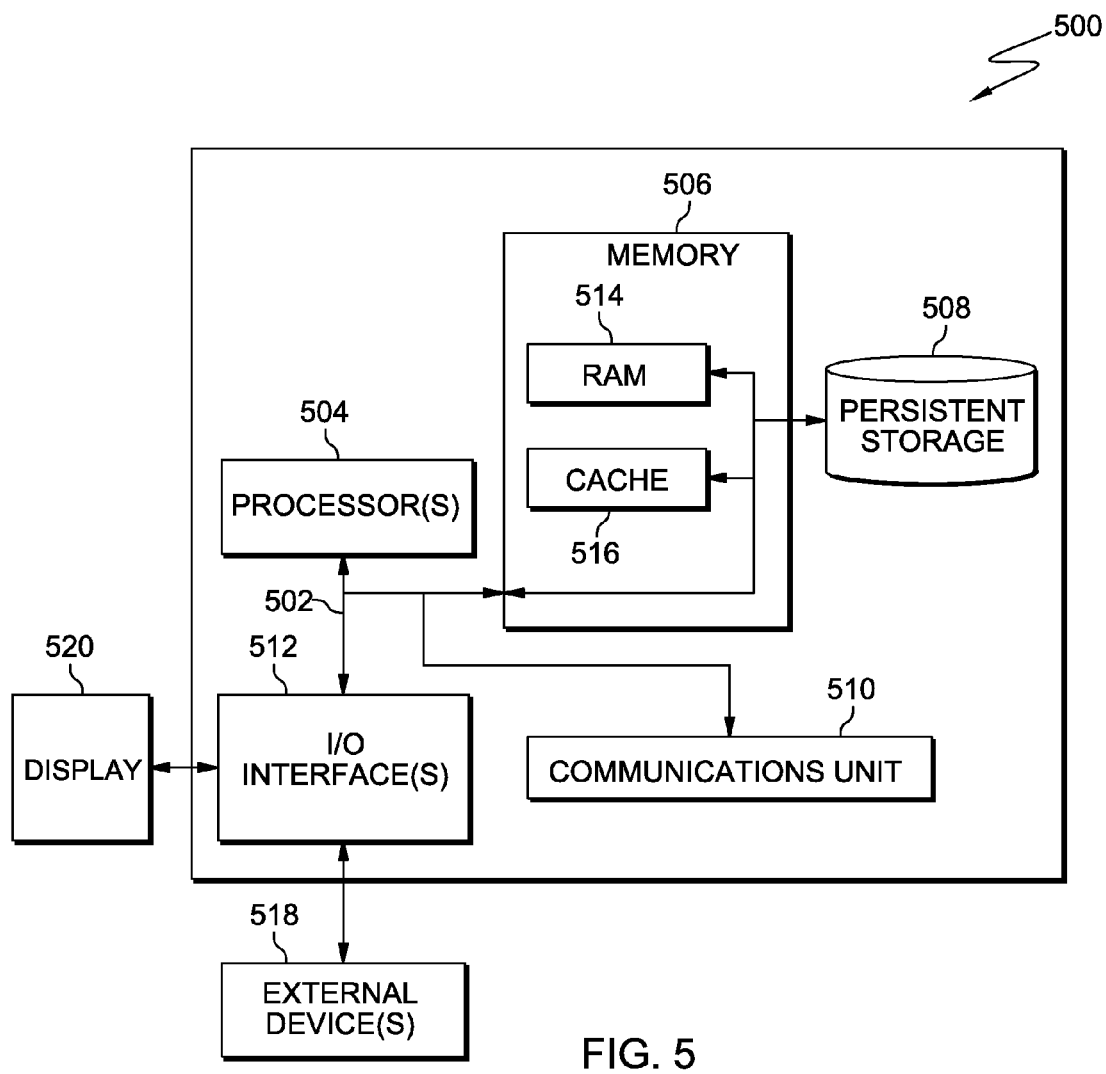
FIG. 5 is a functional block diagram of a computer system in accordance with an embodiment of the present invention.

FIG. 5 depicts a block diagram of components of operator computer device 110, user computing device 120, vehicle computing device 130, or service computing device 240 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing devices 110, 120, 130, 210, 220, 230, or 240 include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Delegation program 114, 214 and access program 134, 234 can be stored in persistent storage 508 for execution by one or more of the respective computer processors 504 via one or more memories of memory 506. In this embodiment, persistent storage 508 includes a magnetic disk. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 102, 202, operator computing device 110, 210, user computing device 120, 220, vehicle computing device 130, 230, and service computing device 240. In these examples, communications unit 510 includes one or more network interface cards. Communications unit 510 may provide communications through the use of either or both physical and wireless communications links. Delegation program 114, 214 and access program 134, 234 may be downloaded to persistent storage 508 through communications unit 510.

I/O interface(s) 512 allows for input and output of data with other devices that may be connected to operator computing device 110, 210, user computing device 120, 220, vehicle computing device 130, 230, and service computing device 240. For example, I/O interface 512 may provide a connection to external devices 518, such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., delegation program 114, 214 and access program 134, 234 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for delegating control of a vehicle, the method comprising the steps of:
   receiving, by one or more computer processors, an identification of a vehicle;
   receiving, by one or more computer processors, an identification of a first user to receive delegation of control of the vehicle;

determining, by one or more computer processors, an authentication information for the first user for the vehicle;

receiving, by one or more computer processors, a request to authenticate the first user for delegation of control of the vehicle to the first user;

determining, by one or more computer processors, the request to authenticate includes at least the authentication information for the first user;

responsive to determining the request to authenticate includes at least the authentication information for the first user, delegating, by one or more computer processors, control of the vehicle to the first user;

receiving, by one or more computer processors, an identification of an access type for the first user of the vehicle;

providing, by one or more computer processors, a notification to the first user of the access type;

providing, by one or more computer processors, a notification to the vehicle of the access type for the first user;

monitoring, by one or more computer processors, information about the vehicle, wherein the information includes at least one of, a location, a speed, and a duration of use;

determining, by one or more computer processors, whether the first user violates the access type; and responsive to determining the first user violates the access type, providing, by one or more computer processors, a notification to a vehicle delegator of the violation of the access type.

2. The method of claim 1, wherein the access type is at least one of: a time period for operation of the vehicle, an area for operation of the vehicle, a limitation on third party delegation, a maximum speed for operation of the vehicle, and a restriction on use of user options within the vehicle.

3. The method of claim 1, further comprising:
responsive to determining the first user has not violated the access type, determining, by one or more computer processors, whether the access type is completed; and
responsive to determining, by one or more computer processors, the access type is completed, returning, by one or more computer processors, the vehicle to the vehicle delegator.

4. The method of claim 1, wherein the authentication information is at least one of: a generated pin code, a custom pin code, one or more biometric values, a software token, a physical item containing identification information, a QR code, a hyperlink, and an encrypted communication.

5. The method of claim 1, further comprising:
receiving, by one or more computer processors, an identification of a second user to receive delegation of control of the vehicle;
determining, by one or more computer processors, an authentication information for the second user for the vehicle;
receiving, by one or more computer processors, an identification of an access type for the second user for the vehicle;
providing, by one or more computer processors, a notification to the second user of the access type; and
providing, by one or more computer processors, a notification to the vehicle of the access type for the second user.

6. A computer program product for delegating control of a vehicle, the computer program product comprising:
one or more computer readable storage media; and
program instructions stored on the one or more computer readable storage media, the program instructions comprising:
program instructions to receive an identification of a vehicle;
program instructions to receive an identification of a first user to receive delegation of control of the vehicle;
program instructions to determine an authentication information for the first user for the vehicle;
program instructions to receive a request to authenticate the first user for delegation of control of the vehicle to the first user;
program instructions to determine the request to authenticate includes at least the authentication information for the first user;
program instructions, responsive to determining the request to authenticate includes at least the authentication information for the first user, to delegate control of the vehicle to the first user;
program instructions to receive an identification of an access type for the first user of the vehicle;
program instructions to provide a notification to the first user of the access type;
program instructions to provide a notification to the vehicle of the access type for the first user;
program instructions to monitor information about the vehicle, wherein the information includes at least one of, a location, a speed, and a duration of use;
program instructions to determine whether the first user violates the access type; and
program instructions, responsive to determining the first user has violated the access type, to provide a notification to a vehicle delegator of the violation of the access type.

7. The computer program product of claim 6, wherein the access type is at least one of: a time period for operation of the vehicle, an area for operation of the vehicle, a limitation on third party delegation, a maximum speed for operation of the vehicle, and a restriction on use of user options within the vehicle.

8. The computer program product of claim 6, further comprising program instructions, stored on the one or more computer readable storage media, to:
responsive to determining the first user has not violated the access type, determine whether the access type is completed; and
responsive to determining the access type is completed, return the vehicle to the vehicle delegator.

9. The computer program product of claim 6, wherein the authentication information is at least one of: a generated pin code, a custom pin code, one or more biometric values, a software token, a physical item containing identification information, a QR code, a hyperlink, and an encrypted communication.

10. The computer program product of claim 6, further comprising program instructions, stored on the one or more computer readable storage media, to:
receive an identification of a second user to receive delegation of control of the vehicle;
determine an authentication information for the second user for the vehicle;
receive an identification of an access type for the second user for the vehicle;
provide a notification to the second user of the access type; and
provide a notification to the vehicle of the access type for the second user.

11. A computer system for delegating control of a vehicle, the computer system comprising:
one or more computer processors;

one or more computer readable storage media; and program instructions, stored on the one or more computer readable storage media for execution by at least one of the one or more computer processors, the program instructions comprising:

program instructions to receive an identification of a vehicle;

program instructions to receive an identification of a first user to receive delegation of control of the vehicle;

program instructions to determine an authentication information for the first user for the vehicle;

program instructions to receive a request to authenticate the first user for delegation of control of the vehicle to the first user;

program instructions to determine the request to authenticate includes at least the authentication information for the first user;

program instructions, responsive to determining the request to authenticate includes at least the authentication information for the first user, to delegate control of the vehicle to the first user;

program instructions to receive an identification of an access type for the first user of the vehicle;

program instructions to provide a notification to the first user of the access type;

program instructions to provide a notification to the vehicle of the access type for the first user;

program instructions to monitor information about the vehicle, wherein the information includes at least one of, a location, a speed, and a duration of use;

program instructions to determine whether the first user violates the access type; and program instructions, responsive to determining the first user has violated the access type, to provide a notification to a vehicle delegator of the violation of the access type.

12. The computer system of claim 11, wherein the access type is at least one of: a time period for operation of the vehicle, an area for operation of the vehicle, a limitation on third party delegation, a maximum speed for operation of the vehicle, and a restriction on use of user options within the vehicle.

13. The computer system of claim 11, further comprising program instructions, stored on the one or more computer readable storage media for execution by the at least one of the one or more computer processors, to:

responsive to determining the first user has not violated the access type, determining whether the access type is completed; and responsive to determining the access type is completed, returning the vehicle to the vehicle delegator.

14. The computer system of claim 11, further comprising program instructions, stored on the one or more computer readable storage media for execution by the at least one of the one or more computer processors, to:

receive an identification of a second user to receive delegation of control of the vehicle;

determine an authentication information for the second user for the vehicle;

receive an identification of an access type for the second user for the vehicle;

providing a notification to the second user of the access type; and providing a notification to the vehicle of the access type for the second user.

* * * * *